(12) United States Patent
Miener

(10) Patent No.: US 11,174,001 B2
(45) Date of Patent: Nov. 16, 2021

(54) FRACTURING SYSTEM FOR A CANOPY OF AN AIRCRAFT

(71) Applicant: THE BOEING COMPANY, Chicago, IL (US)

(72) Inventor: Steven J. Miener, Florissant, MO (US)

(73) Assignee: THE BOEING COMPANY, Chicago, IL (US)

( * ) Notice: Subject to any disclaimer, the term of this patent is extended or adjusted under 35 U.S.C. 154(b) by 9 days.

(21) Appl. No.: 16/807,360

(22) Filed: Mar. 3, 2020

(65) Prior Publication Data

US 2021/0276689 A1 Sep. 9, 2021

(51) Int. Cl.
*B64C 1/32* (2006.01)
*B64C 1/14* (2006.01)

(52) U.S. Cl.
CPC .............. *B64C 1/32* (2013.01); *B64C 1/1476* (2013.01)

(58) Field of Classification Search
CPC ................................. B64C 1/32; B64C 1/1476
See application file for complete search history.

(56) References Cited

U.S. PATENT DOCUMENTS

| | | | | |
|---|---|---|---|---|
| 3,806,069 A * | 4/1974 | Galton | ...................... | B64C 1/32 244/122 AF |
| 4,405,104 A * | 9/1983 | Charman | ............... | B64D 25/10 102/202.7 |
| 5,954,296 A * | 9/1999 | Jahsman | ................... | B64C 1/32 244/121 |
| 2002/0166924 A1* | 11/2002 | Fahey | ...................... | B64C 1/32 244/121 |

* cited by examiner

*Primary Examiner* — Christopher D Hutchens
(74) *Attorney, Agent, or Firm* — The Small Patent Law Group LLC; Joseph M. Butscher

(57) ABSTRACT

A canopy for an aircraft includes a transparent cover, and a severance cord coupled to the transparent cover. The severance cord includes a fragmenting pattern including a plurality of outer perimeter segments that define an outer perimeter of the fragmenting pattern, and a plurality of inner fragmenting segments that are inside the outer perimeter. The fragmenting pattern is configured to break the transparent cover into numerous fragments when the severance cord is detonated.

21 Claims, 7 Drawing Sheets

FRACTURING SYSTEM FOR A CANOPY OF AN AIRCRAFT

FIELD OF THE DISCLOSURE

Embodiments of the present disclosure generally relate to a fracturing system for a canopy over a cockpit of an aircraft.

BACKGROUND OF THE DISCLOSURE

Certain aircraft include a canopy over a cockpit. For example, various military fighter jets include a canopy over a cockpit. The canopy is moveable between an open position, which allows a pilot to enter and exit the cockpit, and a closed position, such as during flight of the aircraft.

During a mission, a pilot may need to eject from the cockpit. For example, the aircraft may be impacted by adversarial ordnance, which may render the aircraft inoperable. As the pilot pulls an ejection seat firing handle to initiate an escape system, a transparency of the canopy is weakened or removed before the seat assembly, on which the pilot is seated, is ejected from the cockpit.

The canopy includes a severance cord that detonates during the ejection sequence. In operation, the severance cord assists in the removal of at least a portion of the canopy during a pilot ejection sequence. A known severance cord installation includes a relatively large pattern that extends over a substantial area of the canopy. The severance cord is coupled to an initiation manifold. As the ejection handle is pulled, a signal is sent via an explosive transfer lines to the initiation manifold, thereby detonating the severance cord. As the severance cord detonates, it severs the transparency of the canopy along a length of the severance cord and, depending on the shape of the severance cord routing, either removes transparency panels from the canopy or weakens the transparency.

However, due to the shape and size of the severed panels of the canopy, the position of the aircraft in the air, as well as aerodynamics and air pressure, the relatively large panels are difficult to propel away from the aircraft. In summary, canopies having severance cords arranged such that the cover (which may be formed of transparent acrylic) of a canopy is broken apart into relatively large panels, which increases the difficulty of propelling the panels a predetermine distance from the aircraft.

SUMMARY OF THE DISCLOSURE

A need exists for a fracturing system for a canopy of an aircraft that is not susceptible to posing a hazard to a pilot that ejects from a cockpit. Further, a need exists for a fracturing system for a canopy that is configured to break a cover of the canopy into small pieces that do not pose a potential hazard to a pilot that ejects from the aircraft.

With those needs in mind, certain embodiments of the present disclosure provide a canopy for an aircraft. The canopy includes a transparent cover, and a severance cord coupled to the transparent cover. The severance cord includes a fragmenting pattern including a plurality of outer perimeter segments that define an outer perimeter of the fragmenting pattern, and a plurality of inner fragmenting segments that are inside the outer perimeter. The fragmenting pattern is configured to break the transparent cover into numerous fragments when the severance cord is detonated.

In at least one embodiment, the outer perimeter is diamond shaped. In at least one embodiment, the plurality of inner fragmenting segments form a substantially S-shape.

The canopy may include a frame. The transparent cover may be secured to the frame.

In at least one embodiment, the severance cord includes a fore segment and an aft segment. The fragmenting pattern is between the fore segment and the aft segment. One or both of the fore segment or the aft segment may be straight, linear, and aligned with a central longitudinal plane of the canopy.

In at least one embodiment, the plurality of outer perimeter segments include a first outer perimeter segment, a second outer perimeter segment, a third outer perimeter segment, and a fourth outer perimeter segment. The outer perimeter is defined by the first outer perimeter segment, the second outer perimeter segment, the third outer perimeter segment, and the fourth outer perimeter segment.

As an example, the fragmenting pattern includes a first outer perimeter segment that connects to a fore segment, a second outer perimeter segment connected to the first outer perimeter segment, a first inner fragmenting segment connected to the second outer perimeter segment, a second inner fragmenting segment connected to the first inner fragmenting segment, a third outer perimeter segment that connects to an aft segment, a third inner fragmenting segment connected to the second inner fragmenting segment, a fourth inner fragmenting segment connected to the third inner fragmenting segment, a fifth inner fragmenting segment connected to the fourth inner fragmenting segment, a sixth inner fragmenting segment connected to the fifth inner fragmenting segment, a seventh inner fragmenting segment connected to the sixth inner fragmenting segment, an eight inner fragmenting segment connected to the seventh inner fragmenting segment, a ninth inner fragmenting segment connected to the eighth inner fragmenting segment, a tenth inner fragmenting segment connected to the ninth inner fragmenting segment, and a fourth outer perimeter segment that connects the tenth inner fragmenting segment to the third outer perimeter segment.

In at least one embodiment, the fragmenting pattern does not laterally extend around or otherwise to sides of a central longitudinal axis of the canopy.

The fragmenting pattern is configured to be positioned over a seat assembly within a cockpit of the aircraft. The seat assembly is configured to support a seated pilot. In at least one embodiment, the fragmenting pattern does not substantially extend past an outer perimeter envelope of the seat assembly.

Certain embodiments of the present disclosure provide an aircraft including a cockpit, a seat assembly within the cockpit, a canopy over the cockpit (wherein the canopy includes a transparent cover), and a fracturing system that is configured to fracture at least a portion of the transparent cover into numerous fragments during an ejection sequence. The fracturing system includes a severance cord coupled to the transparent cover. The severance cord includes a fragmenting pattern, as described herein. In at least one embodiment, the fracturing system further includes an ejection mechanism coupled to the severance cord through a explosive transfer line, which may include a series of components including explosive transfer lines, which may provide signal transfer between components.

Certain embodiments of the present disclosure provide a method of manufacturing a canopy for an aircraft. The method includes providing a transparent cover, and coupling a severance cord to the transparent cover. Said coupling includes forming the severance cord into a fragmenting pattern, defining an outer perimeter of the fragmenting pattern with a plurality of outer perimeter segments, and disposing a plurality of inner fragmenting segments inside the outer perimeter. The fragmenting pattern is configured to break the transparent cover into numerous fragments when the severance cord is detonated.

In at least one embodiment, the method also includes disposing the fragmenting pattern between a fore segment and an aft segment.

In at least one embodiment, the method also includes forming one or both of the fore segment or the aft segment to be straight, linear, and aligned with a central longitudinal plane of the canopy.

In at least one embodiment, the method also includes positioning the fragmenting pattern over a seat assembly within a cockpit of the aircraft.

DETAILED DESCRIPTION OF THE DISCLOSURE

Figure 1:
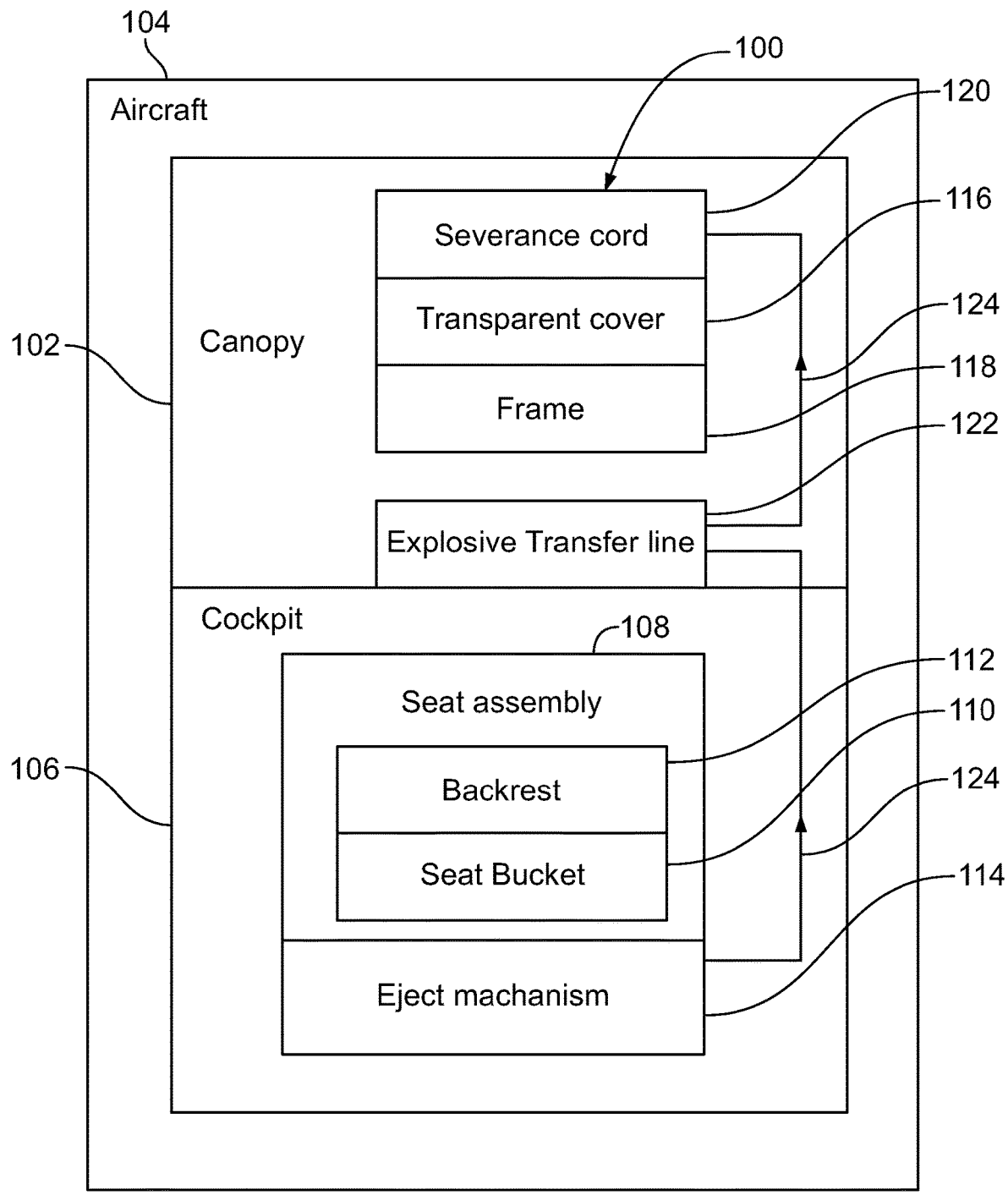
FIG. 1 illustrates a schematic block diagram of a fracturing system for a canopy of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a fracturing system for a canopy of an aircraft. The fracturing system includes a severance cord coupled to a transparent cover of the canopy. The severance cord includes a fragmenting pattern including a plurality of outer perimeter segments positioned over a seat assembly of the cockpit. The fragmenting pattern also includes a plurality of inner fragmenting segments that are inward from an outer perimeter of the fragmenting pattern defined by the plurality of outer perimeter segments. In at least one embodiment, the outer perimeter of the fragmenting pattern is diamond shaped. It has been found, unexpectedly, that as the severance cord detonates, the fragmenting pattern breaks at least a portion of the transparent cover apart into a plurality of fragments (for example, hundreds or thousands of shards, chips, or other such severed pieces) that are small enough to be blown out into the atmosphere away from the cockpit, and pose little to no risk of hazard to a pilot ejecting from the cockpit.

Certain embodiments of the present disclosure provide a canopy for an aircraft. The canopy includes a transparent cover, and a severance cord coupled to the transparent cover. The severance cord includes a fragmenting pattern including a plurality of outer perimeter segments that define an outer perimeter of the fragmenting pattern, and a plurality of inner fragmenting segments that are inside the outer perimeter. The fragmenting pattern is configured to break the transparent cover into numerous fragments when the severance cord is detonated.

Certain embodiments of the present disclosure provide an aircraft including a cockpit, a seat assembly within the cockpit, a canopy over the cockpit, wherein the canopy comprises a transparent cover, and a fracturing system that is configured to fracture at least a portion of the transparent cover into numerous fragments during an ejection sequence. The fracturing system includes a severance cord having the fragmenting pattern, as described herein.

The fragmenting pattern is configured to cut and remove a relatively small area of the transparent cover directly over a pilot seated in the seat assembly. By removing the relatively small area into a number of smaller pieces defined by the fragmenting pattern (as the severance cord detonates), a hazard potential is eliminated. In at least one embodiment, the severance cord is configured to break up the transparent cover in small enough pieces that are propelled higher into the airstream, and broken up enough to eliminate a hazard to a pilot due to the small size and mass of the panel remnants. Regardless of the aircraft fore body shape and associated air loads on the canopy, the fragmenting pattern eliminates hazards associated with panel fly-away. Further, because entire panels are not propelled into the airstream, but only small fragments of the transparent cover, hazards associated with panel fly-away are eliminated regardless of the aircraft speed and/or attitude.

FIG. 1 illustrates a schematic block diagram of a fracturing system 100 for a canopy 102 of an aircraft 104, according to an embodiment of the present disclosure. The aircraft 104 includes a cockpit 106 that is covered by the canopy 102. The canopy 102 is moveable between an open position, in which a pilot may enter and exit the cockpit, and a closed position, such as during flight of the aircraft 104.

The cockpit 106 includes a seat assembly 108, which includes a seat bucket 110 and a backrest 112 coupled to the seat bucket 110. In at least one embodiment, the seat bucket 110 includes a lower sitting portion, such as a seat or bucket, side panels, and the like. In at least one embodiment, the seat bucket 110 also includes pyrotechnic components, such as rockets, integrated therein, to allow for ejection of the seat assembly 108. A pilot sits on the seat bucket 110, and the backrest 112 supports the back of the pilot.

An eject mechanism 114 is disposed within the cockpit 106. The eject mechanism 114 may be secured to a portion of the seat assembly 108, such as at a front or rear of the seat bucket 110. The eject mechanism 114 may be an eject handle or button, for example.

The canopy 102 includes a transparent cover 116 secured to a frame 118. The transparent cover 116 is formed of a robust, sturdy, and transparent material, such as acrylic. The frame 118 may be formed of metal.

A severance cord 120 is coupled to the transparent cover 116. For example, the severance cord 120 is secured to an inner mold line, or underside, of the transparent cover 116

(such as within the cockpit 106 when the canopy 102 is in a closed position), such as through adhesives.

In at least one embodiment, the severance cord 120 is formed of metal tubing, such as tin or lead. The severance cord 120 can be formed in a chevron shape. For example, the severance cord 120 may include a chevron-shaped sheathing. The metal tubing or sheathing may be contained in a charge holder, which may be formed of rubber and is configured to attenuate back blast. An explosive material is contained within the metal tubing. When the explosive material is detonated, the severance cord breaks at least a portion of the transparent cover 116 into numerous small fragments (instead of two large panels).

An explosive transfer line 122 is coupled between the severance cord 120 and the eject mechanism 114. In operation, when the eject mechanism 114 is engaged (for example, pulled), a detonating signal 124 is sent along the explosive transfer line 122 to the severance cord 120, which causes the severance cord 120 to detonate, and break at least a portion of the transparent cover 116 into numerous small fragments that are propelled into the atmosphere away from the cockpit 106, thereby posing little to no risk to a pilot ejecting from the cockpit 106. In at least one embodiment, an initiation manifold is configured is transfer the signal from the explosive transfer line 122 and initiate detonation of the severance cord 120.

In at least one embodiment, when the fracturing system 100 is initiated to detonate the severance cord 120, there will be hundreds, if not thousands, of small transparency fragments along with larger pieces based on the pattern of the severance cord 120. The larger sized pieces, due to a more dense pattern, are still relatively small (as compared to cut pieces in known transparency removal systems) and are propelled farther away from the canopy 102. Because the pattern of the severance cord 120 is directly over a pilot, and due to the velocity of the aircraft 104, the majority of the panel remnants will be aft of the pilot during ejection from the cockpit 106. However, even if the ejection condition results in the severed pieces striking the pilot, the location of such severed piece (primarily over the helmet of the pilot) and their small size/low mass are not large enough to result in pilot injury.

Figure 2:
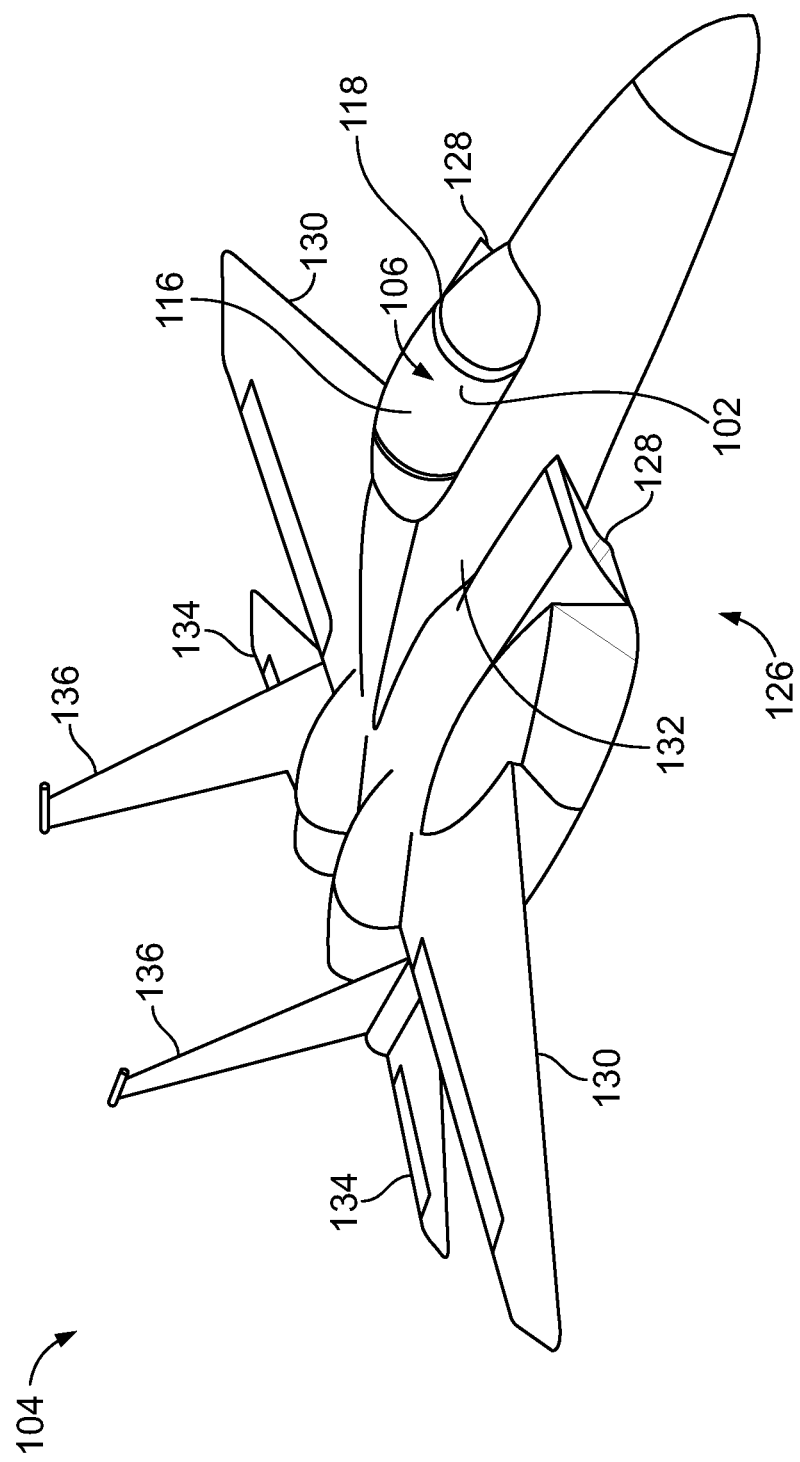
FIG. 2 illustrates a perspective front view of the aircraft, according to an embodiment of the present disclosure.

FIG. 2 illustrates a perspective front view of the aircraft 104, according to an embodiment of the present disclosure. As shown, the aircraft 104 is a military fighter jet. The aircraft 104 includes a propulsion system 126 that includes two engines 128, for example. Optionally, the propulsion system 126 may include more or less engines 128 than shown. The engines 128 are carried by wings 130 and/or a fuselage 132 of the aircraft 104. In other embodiments, the engines 128 may be carried by other portions of the aircraft 104. The fuselage 132 also supports horizontal stabilizers 134 and vertical stabilizers 136. The fuselage 132 of the aircraft 104 includes the cockpit 106 covered by the canopy 102. Optionally, the aircraft 104 may be various other types of military aircraft. Alternatively, the aircraft may be various types of commercial aircraft.

The canopy 102 includes the transparent cover 116 secured to the frame 118. Referring to FIGS. 1 and 2, and as described herein, the fracturing system 100 includes the severance cord 120, which includes the severance cord 120 coupled to the transparent cover 116.

Figure 3A:
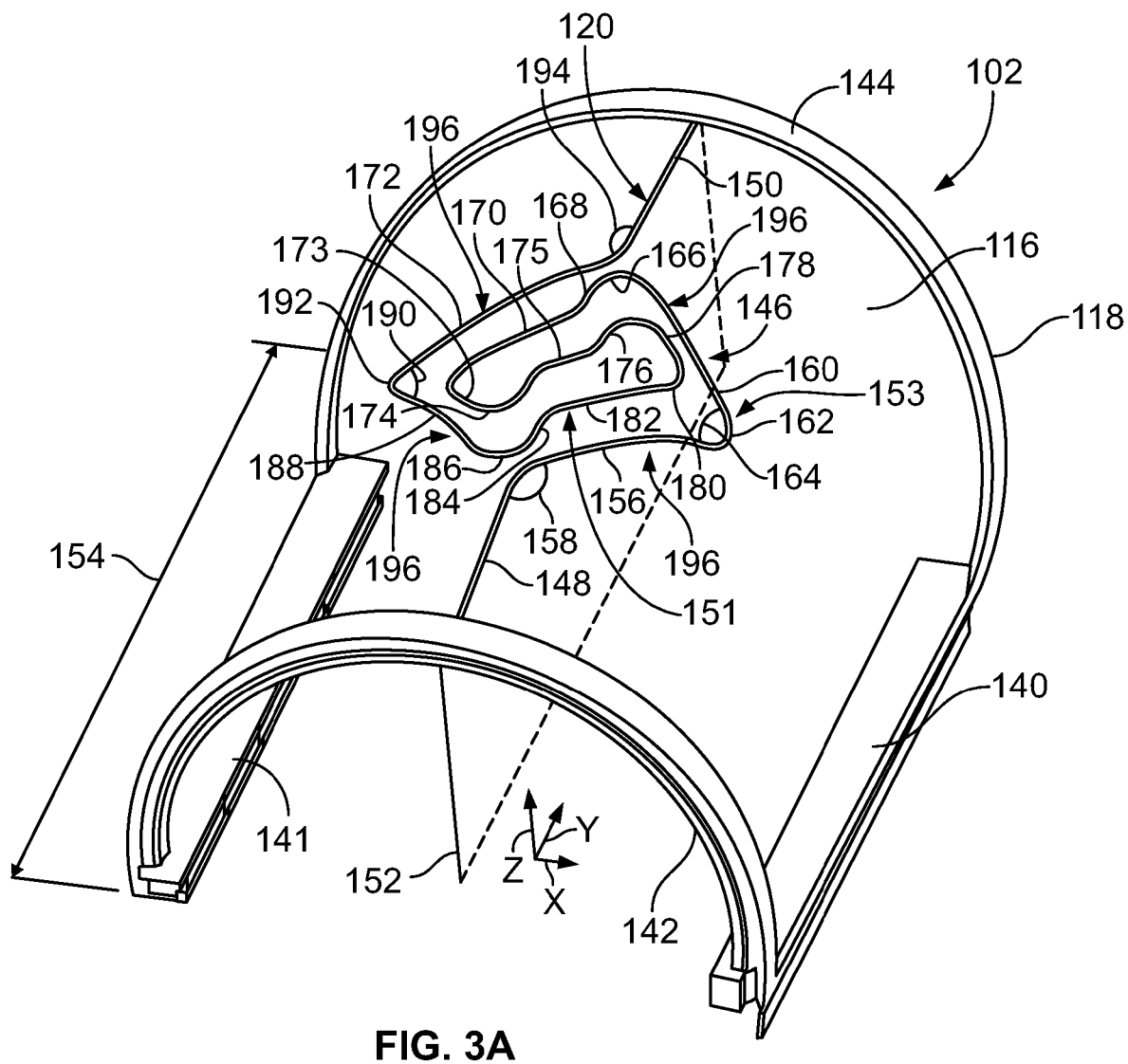
FIG. 3A illustrates a perspective top view of the canopy, according to an embodiment of the present disclosure.
Figure 3B:
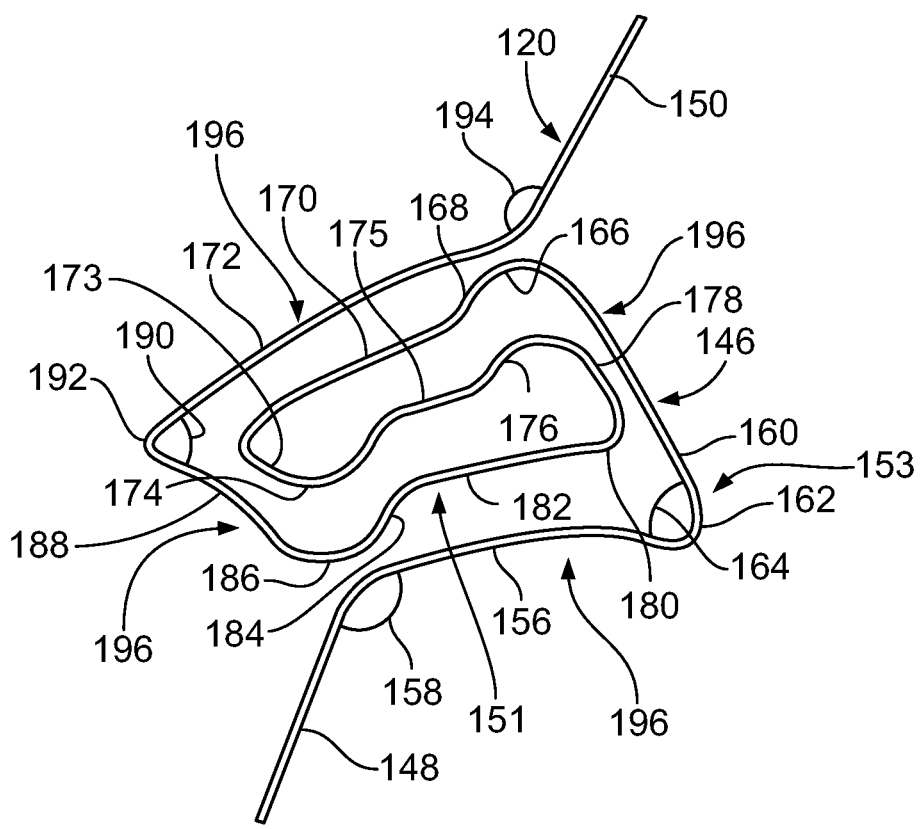
FIG. 3B illustrates a top view of a severance cord, according to an embodiment of the present disclosure.

FIG. 3A illustrates a perspective top view of the canopy 102, according to an embodiment of the present disclosure. FIG. 3B illustrates a top view of the severance cord 120. The frame 118 includes opposed lateral beams 140 and 141 connected to an arcuate fore arch 142 and an arcuate aft arch 144. The transparent cover 116 extends between the lateral beams 140 and 141, the fore arch 142, and the aft arch 144. In at least one embodiment, the transparent cover 116 is formed of a transparent plastic material, such as acrylic, for example. The transparent cover 116 is arcuately shaped, and may conform to a shape defined between the fore arch 142 and the aft arch 144.

The severance cord 120 is disposed on the canopy 102 such that the severance cord 120 has a predetermined shape, also referred to herein as a fragmenting pattern 146. The fragmenting pattern 146 is defined between a fore segment 148 and an aft segment 150. The fore segment 148 and the aft segment 150 may be straight linear segments that are aligned with (for example, reside within) a central longitudinal plane 152 of the canopy 102. As shown in FIG. 3A, the central longitudinal plane 152 is a vertical central longitudinal plane that is parallel to a Y-Z plane. The central longitudinal plane 152 bisects the canopy 102 about a length 154. One or both of the fore segment 148 and/or the aft segment 150 is coupled to the explosive transfer line 122 (shown in FIG. 1) via an initiation manifold.

The fragmenting pattern 146 of the severance cord 120 includes a first outer perimeter segment 156 that connects to the fore segment 148. The first outer perimeter segment 156 extends aft towards the aft arch 144 and angles away from the fore segment 148 at an angle 158 in relation to the fore segment 148. The angle 158 is an obtuse angle. The first outer perimeter segment 156 extends away from the central longitudinal plane 152 toward the lateral beam 140.

The first outer perimeter segment 156 connects to a second outer perimeter segment 160, such as through an arcuate bend 162. The second outer perimeter segment 160 angles inwardly toward the central longitudinal plane 152 at an angle 164 in relation to the first outer perimeter segment 156. In at least one embodiment, the angle 164 is within a range of 45-90 degrees. The angle may be a right angle or an acute angle.

The second outer perimeter segment 160 connects to an inward bend 166 that, in turn, connects to a first inner fragmenting segment 168, which may be a linear segment that resides in the central longitudinal plane 152. The first inner fragmenting segment 168 connects to a second inner fragmenting segment 170 that angles away from the central longitudinal plane 152, and is inboard (that is, closer to the central longitudinal plane 152) than a third outer perimeter segment 172 that connects to the aft segment 150. In general, the inner fragmenting segments on one side of the central longitudinal panel 152, as described herein, are inboard from the outer perimeter segments on the same side of the central longitudinal plane 152.

The second inner fragmenting segment 170 connects to a third inner fragmenting segment 173 that angles towards the fore arch 142 (that is, in a fore direction relative to the second inner fragmenting segment 170) and the central longitudinal plane 152. The third inner fragmenting segment 173, in turn, connects to a fourth inner fragmenting segment 174 that curves rearwardly toward the aft arch 144.

The fourth inner fragmenting segment 174 connects to a fifth inner fragmenting segment 175 that crosses the central longitudinal plane 152, and connects to a sixth inner fragmenting segment 176, which curves away from the central longitudinal plane 152 towards the lateral beam 140. The sixth inner fragmenting segment 176 connects to a seventh inner fragmenting segment 178 that extends towards the fore arch 142 and the lateral beam 140.

The seventh inner fragmenting segment 178 connects to an eighth inner fragmenting segment 180 that curves towards the fore arch 142 and the central longitudinal plane 152. The eighth inner fragmenting segment 180 connects to a ninth inner fragmenting segment 182 that extends towards the fore arch 142 and the central longitudinal plane 152.

The ninth inner fragmenting segment 182 connects to a tenth inner fragmenting segment 184, which may be linear segment that resides in the central longitudinal plane 152. The tenth inner fragmenting segment 184 connects to an outward bend 186 that curves away from the central longitudinal plane 152 toward the lateral beam 141. The outward bend 186 connects to a fourth outer perimeter segment 188 that extends away from the central longitudinal plane 152 and toward the lateral beam 141.

The fourth outer perimeter segment 188 connects to the third outer perimeter segment 172 at an angle 190 defined by an arcuate bend 192. The angle 190 may be the same or similar to the angle 164.

The third outer perimeter segment 172 extends inwardly from the fourth outer perimeter segment 188 toward the central longitudinal plane 152, and in an aft direction toward the aft arch 144. The third outer perimeter segment 172, in turn, connects to the aft segment 150 at an angle 194, which may be the same or similar to the angle 158.

As described, the fragmenting pattern 146 includes a plurality of outer perimeter segments 153, such as the first outer perimeter segment 156, the second outer perimeter segment 160, the third outer perimeter segment 172, and the fourth outer perimeter segment 188, which define an outer perimeter 196 of the fragmenting pattern 146. As shown, the outer perimeter 196 is shaped as a diamond. Optionally, the outer perimeter 196 may be shaped in a different manner, such as rectangular, triangular, or circular. It has been found, unexpectedly, that the outer perimeter 196 shaped as a diamond with a plurality of inner fragmenting segments 151 (such as 168, 170, 172, 174, 175, 176, 178, 180, 182, and 184) breaks apart at least a portion of the transparent cover 116 (such as the portion defined within the outer perimeter 196) into numerous (for example, hundreds or thousands) fragments (for example, shards, chips, or other such severed pieces) when the severance cord 120 is detonated, thereby eliminating hazard to a pilot that ejects from the cockpit 106 (shown in FIG. 1). In particular, it has been found, unexpectedly, that as the severance cord 120 detonates, the fragmenting pattern 146 shown in FIG. 3 breaks a portion of the transparent cover 116 (such as the portion within the outer perimeter 196) apart into a plurality of fragments (for example, hundreds or thousands) that are small enough to be blown out into the atmosphere away from the cockpit 106 (shown in FIG. 1), and pose little to no risk of hazard to a pilot ejecting from the cockpit 106.

The fragmenting pattern 146 includes a plurality of inner fragmenting segments 151 (such as 168, 170, 172, 174, 175, 176, 178, 180, 182, and 184) that are inboard (that is, closer to the central longitudinal plane 152) from the outer perimeter 196. I the illustrated embodiment, the plurality of inner fragmenting segments (such as 168, 170, 172, 174, 175, 176, 178, 180, 182, and 184) define a substantially S-shaped pattern that is disposed within the outer perimeter 196. Each of the inner fragmenting segments is oriented in a different manner (for example, angled or otherwise not linearly aligned with) than another connecting inner fragmenting segment. For example, the second inner fragmenting segment 170 connects to a third inner fragmenting segment 172 that is angled in relation to the second inner fragmenting segment 170. The various inner fragmenting segments are angled, curved, and otherwise directionally different from connecting inner fragmenting segments, as shown in FIG. 3.

The inner fragmenting segments cut the transparent cover 116 into numerous (for example, greater than four) small fragments when the severance cord 120 is detonated.

The fragmenting pattern 146 includes a plurality of outer perimeter segments that define the outer perimeter 196 of the fragmenting pattern 146. A plurality of inner fragmenting segments are inside (for example, inboard from) the outer perimeter 196.

Optionally, the fragmenting pattern 146 may include more or less inner fragmenting segments than shown and described. For example, the fragmenting pattern 146 may include fifteen or more inner fragmenting segments. As another example, the fragmenting pattern 146 may include three inner fragmenting segments.

Figure 4:
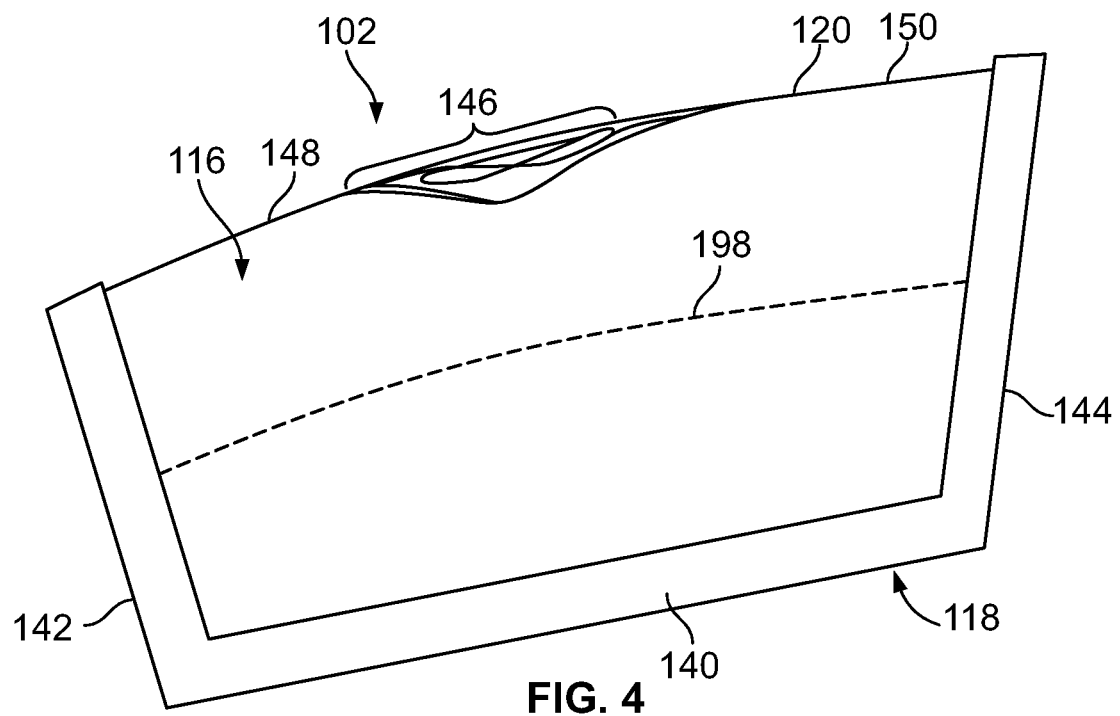
FIG. 4 illustrates a lateral view of the canopy of FIG. 3.

FIG. 4 illustrates a lateral view of the canopy 102 of FIG. 3. As shown, the severance cord 120 does not substantially extend towards the lateral beams 140 and 141 (shown in FIG. 3). Instead, the severance cord 120, including the fragmenting pattern 146 is generally inboard from the lateral beams 140 and 141, and does not extend into a lateral field of view of a pilot within the cockpit 106 (shown in FIG. 1). In at least one embodiment, the fragmenting pattern 146 does not laterally extend around or otherwise to sides of a longitudinal axis 198 of the canopy 102.

Figure 5:
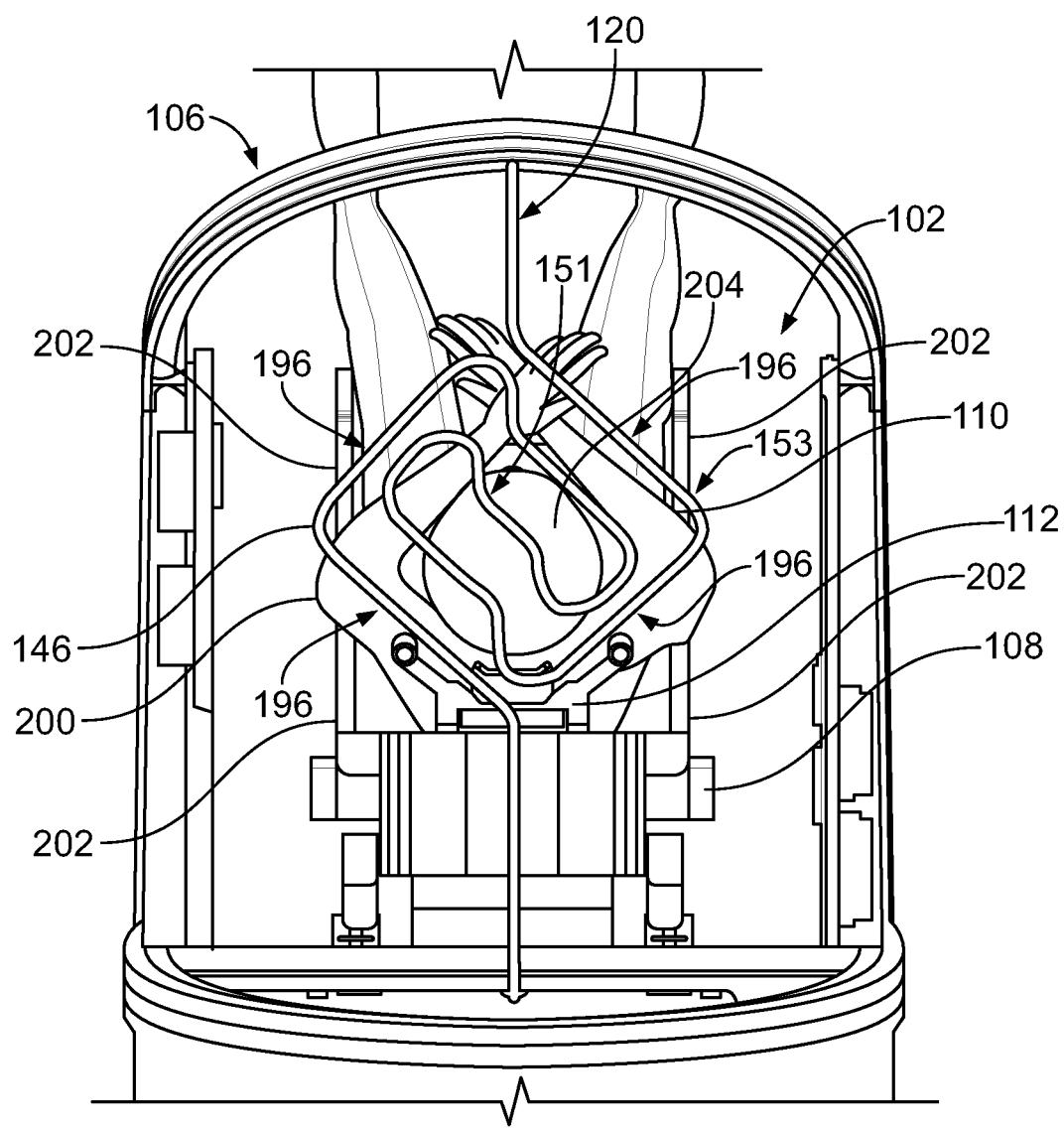
FIG. 5 illustrates a top view of the canopy over a cockpit, according to an embodiment of the present disclosure.

FIG. 5 illustrates a top view of the canopy 102 over the cockpit 106, according to an embodiment of the present disclosure. In at least one embodiment, the fragmenting pattern 146 is positioned directly over the seat assembly 108. For example, the fragmenting pattern 146 is directly above the seat bucket 110 on which a pilot 200 is seated. The fragmenting pattern 146 may not substantially extend (for example, less than 2 inches) past an outer perimeter envelope 202 of the seat assembly 108. That is, portions of the fragmenting pattern 146 may not laterally, forwardly, and rearwardly substantially extend through and past the outer perimeter envelope 202. In at least one embodiment, the fragmenting pattern does not extend past the outer perimeter envelope 202 of the seat assembly 108. In this manner, the fragmenting pattern 146 is positioned directly over a head 204 of the pilot 200, so that when the severance cord 120 detonates, the fragmenting pattern 146 breaks the portion of the transparent cover 116 within the outer perimeter 196 into numerous small fragments, thereby ensuring that the pilot 200 does not sustain impact injury with the canopy, and also ensuring that the fragments are blown outwardly into the atmosphere, instead of into the cockpit 106.

Figure 6:
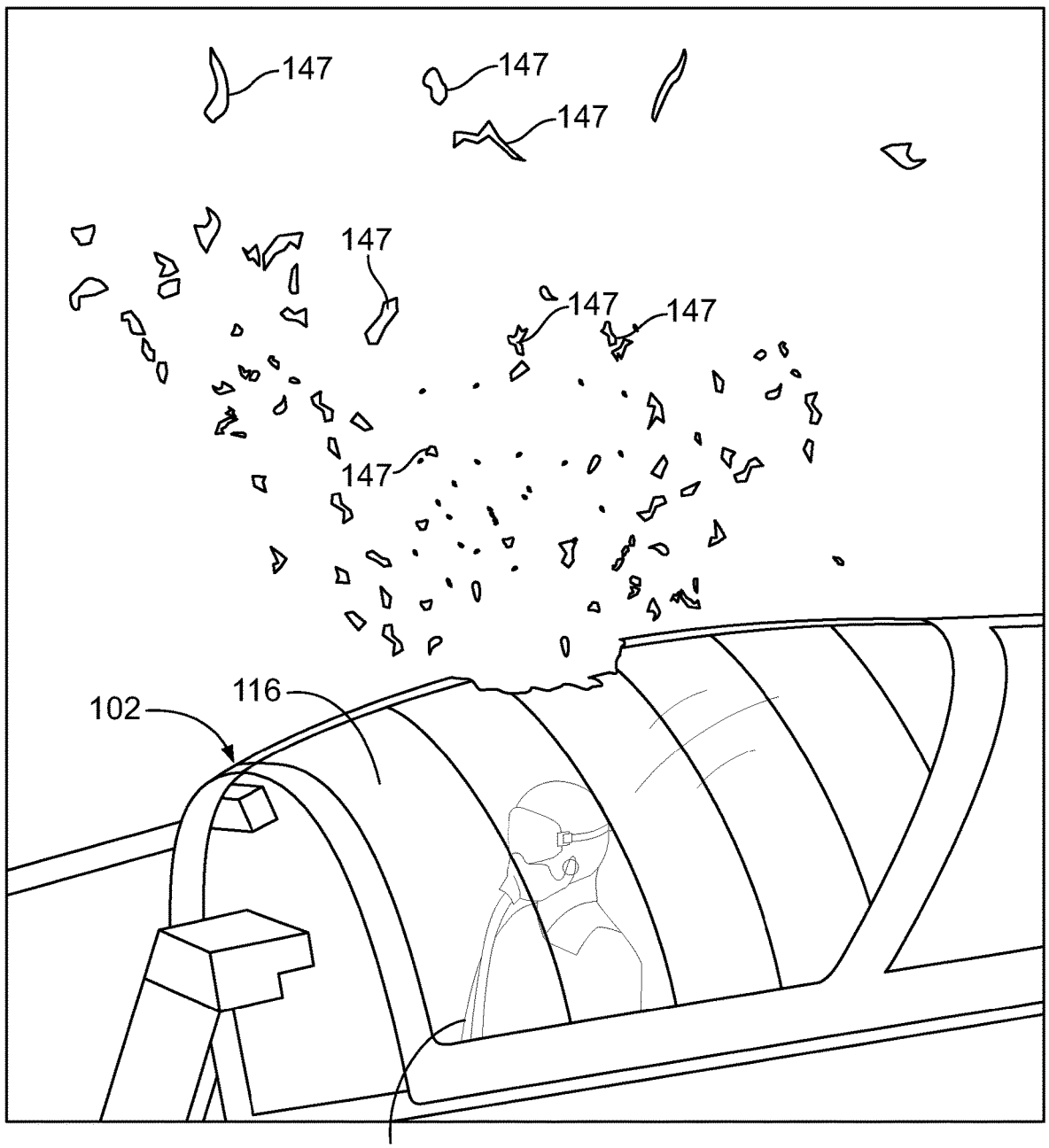
FIG. 6 illustrates a perspective view of a transparent cover breaking apart into fragments, according to an embodiment of the present disclosure.

FIG. 6 illustrates a perspective view of the transparent cover 116 breaking apart into fragments 147, according to an embodiment of the present disclosure. Referring to FIGS. 1-6, as the severance cord 120 detonates, the fragmenting pattern 146 breaks a portion of the transparent cover 116 (such as the portion within the outer perimeter 196) apart into a plurality of fragments 147 that are small enough to be blown out into the atmosphere away from the cockpit 106 (shown in FIG. 1), and pose little to no risk of hazard to a pilot ejecting from the cockpit 106. The fragments 147 may be smaller or larger than shown. Further, the transparent cover 116 may be broken into more or less fragments 147 than shown.

Figure 7:
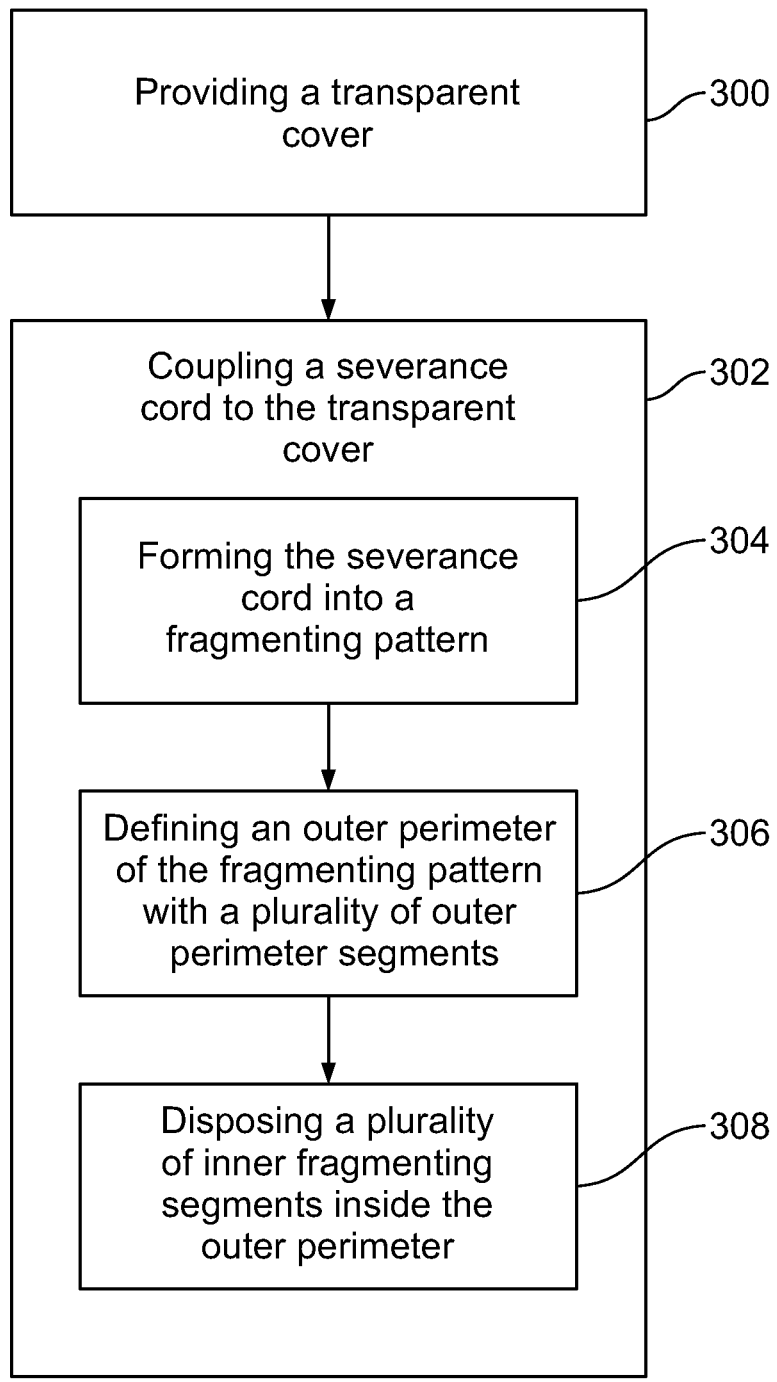
FIG. 7 illustrates a flow chart of a method of manufacturing a canopy of an aircraft, according to an embodiment of the present disclosure.

FIG. 7 illustrates a flow chart of a method of manufacturing a canopy of an aircraft, according to an embodiment of the present disclosure. Referring to FIGS. 1-7, the method includes providing, at 300, the transparent cover 116, and coupling, at 302, the severance cord 120 to the transparent cover 116. The coupling 302 includes forming, at 304, the severance cord 120 into the fragmenting pattern 146, defining, at 306, the outer perimeter 196 of the fragmenting pattern 146 with a plurality of outer perimeter segments 153, and disposing the plurality of inner fragmenting segments 151 inside the outer perimeter 196. The fragmenting pattern 146 is configured to break the transparent cover 116 into numerous fragments when the severance cord 120 is detonated.

In at least one embodiment, the method also includes disposing the fragmenting pattern 146 between the fore segment 148 and the aft segment 150.

In at least one embodiment, the method also includes forming one or both of the fore segment 148 or the aft segment 150 to be straight, linear, and aligned with the central longitudinal plane 152 of the canopy 102.

In at least one embodiment, the method also includes positioning the fragmenting pattern 146 over the seat assembly 108 within the cockpit 106 of the aircraft 104.

As described herein, embodiments of the present disclosure provide a fracturing system for a canopy of an aircraft that is not susceptible to posing a hazard to a pilot that ejects from a cockpit. Further, embodiments of the present disclosure provide a fracturing system for a canopy that is configured to break a cover of the canopy into small fragments that do not pose a potential hazard to a pilot that ejects from the aircraft.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A canopy for an aircraft, the canopy comprising:
a transparent cover; and
a severance cord coupled to the transparent cover,
the severance cord formed into a fragmenting pattern including:
a plurality of outer perimeter segments that define an outer perimeter of the fragmenting pattern, wherein the plurality of outer perimeter segments comprise: a first outer perimeter segment; a second outer perimeter segment; a third outer perimeter segment; and a fourth outer perimeter segment, wherein the outer perimeter is defined by the first outer perimeter segment, the second outer perimeter segment, the third outer perimeter segment, and the fourth outer perimeter segment; and
a plurality of inner fragmenting segments that are inside the outer perimeter, wherein the plurality of inner fragmenting segments are non-collinear, wherein the plurality of inner fragment segments comprise: a first inner fragmenting segment; a second inner fragment segment; a third inner fragmenting segment; and a fourth inner fragmenting segment,
wherein the fragmenting pattern is configured to break the transparent cover into numerous fragments when the severance cord is detonated.

2. The canopy of claim 1, wherein the outer perimeter is diamond shaped.

3. The canopy of claim 1, wherein the plurality of inner fragmenting segments form a substantially S-shape.

4. The canopy of claim 1, further comprising a frame, wherein the transparent cover is secured to the frame.

5. The canopy of claim 1, wherein the severance cord further comprises a fore segment and an aft segment, wherein the fragmenting pattern is between the fore segment and the aft segment.

6. The canopy of claim 5, wherein one or both of the fore segment or the aft segment are straight, linear, and aligned with a central longitudinal plane of the canopy.

7. The canopy of claim 1, wherein the fragmenting pattern does not laterally extend around or otherwise to sides of a central longitudinal axis of the canopy.

8. The canopy of claim 1, wherein the fragmenting pattern is configured to be positioned over a seat assembly within a cockpit of the aircraft.

9. The canopy of claim 8, wherein the fragmenting pattern is configured to not substantially extend past an outer perimeter envelope of the seat assembly.

10. The canopy of claim 1, wherein the plurality of inner fragmenting segments further comprise: a fifth inner fragmenting segment; a sixth inner fragmenting segment; an eighth inner fragmenting segment; a ninth inner fragmenting segment; and a tenth inner fragmenting segment.

11. An aircraft comprising:
a cockpit;
a seat assembly within the cockpit;
a canopy over the cockpit, wherein the canopy comprises a transparent cover; and
a fracturing system that is configured to fracture at least a portion of the transparent cover into numerous fragments during an ejection sequence, the fracturing system comprising a severance cord coupled to the transparent cover, the severance cord formed into a fragmenting pattern including:
a plurality of outer perimeter segments that define an outer perimeter of the fragmenting pattern, wherein the plurality of outer perimeter segments comprise: a first outer perimeter segment; a second outer perimeter segment; a third outer perimeter segment; and a fourth outer perimeter segment, wherein the outer perimeter is defined by the first outer perimeter segment, the second outer perimeter segment, the third outer perimeter segment, and the fourth outer perimeter segment; and
a plurality of inner fragmenting segments that are inside the outer perimeter, wherein the plurality of inner fragmenting segments are non-collinear, wherein the plurality of inner fragment segments comprise: a first inner fragmenting segment; a second inner fragment segment; a third inner fragmenting segment; and a fourth inner fragmenting segment,
wherein the fragmenting pattern is configured to break the transparent cover into numerous fragments when the severance cord is detonated.

12. The aircraft of claim 11, wherein the fracturing system further comprises an ejection mechanism coupled to the severance cord through an explosive transfer line.

13. The aircraft of claim 11, wherein the severance cord further comprises a fore segment and an aft segment, wherein the fragmenting pattern is between the fore segment and the aft segment, wherein one or both of the fore segment or the aft segment are straight, linear, and aligned with a central longitudinal plane of the canopy.

14. The aircraft of claim 11, wherein the fragmenting pattern does not laterally extend around or otherwise to sides of a central longitudinal axis of the canopy.

15. The aircraft of claim 11, wherein the fragmenting pattern is positioned over the seat assembly.

16. The aircraft of claim 11, wherein the fragmenting pattern does not substantially extend past an outer perimeter envelope of the seat assembly.

17. The aircraft of claim 11, wherein none of the first outer perimeter segment, the second outer perimeter segment, the third outer perimeter segment, and the fourth outer perimeter segment are inside one another.

18. A method of manufacturing a canopy for an aircraft, the method comprising:
providing a transparent cover; and
coupling a severance cord to the transparent cover,
wherein said coupling comprises forming the severance cord into a fragmenting pattern,
wherein said forming comprises:
defining an outer perimeter of the fragmenting pattern with a plurality of outer perimeter segments, wherein the plurality of outer perimeter segments comprise: a first outer perimeter segment; a second outer perimeter segment; a third outer perimeter segment; and a fourth outer perimeter segment, wherein the outer perimeter is defined by the first outer perimeter segment, the second outer perimeter segment, the third outer perimeter segment, and the fourth outer perimeter segment; and
disposing a plurality of inner fragmenting segments inside the outer perimeter, wherein the plurality of inner fragment segments are non-collinear, wherein the plurality of inner fragment segments comprise: a first inner fragmenting segment; a second inner fragment segment; a third inner fragmenting segment; and a fourth inner fragmenting segment,
wherein the fragmenting pattern is configured to break the transparent cover into numerous fragments when the severance cord is detonated.

19. The method of claim 18, further comprising disposing the fragmenting pattern between a fore segment and an aft segment.

20. The method of claim 19, further comprising forming one or both of the fore segment or the aft segment to be straight, linear, and aligned with a central longitudinal plane of the canopy.

21. The method of claim 18, further comprising positioning the fragmenting pattern over a seat assembly within a cockpit of the aircraft.

* * * * *